United States Patent
Bogusz et al.

(10) Patent No.: US 10,255,195 B2
(45) Date of Patent: Apr. 9, 2019

(54) APPARATUS AND METHOD FOR PERFORMING ADDRESS TRANSLATION

(71) Applicant: ARM LIMITED, Cambridge (GB)

(72) Inventors: Michal Karol Bogusz, Cambridge (GB); Quinn Carter, Ontario (CA); Andrew Brookfield Swaine, Sheffield (GB)

(73) Assignee: ARM LIMITED, Cambridge (GB)

( * ) Notice: Subject to any disclaimer, the term of this patent is extended or adjusted under 35 U.S.C. 154(b) by 0 days.

(21) Appl. No.: 15/614,644

(22) Filed: Jun. 6, 2017

(65) Prior Publication Data
US 2018/0004678 A1 Jan. 4, 2018

(30) Foreign Application Priority Data

Jun. 29, 2016 (GB) .................................. 1611291.4

(51) Int. Cl.
*G06F 12/10* (2016.01)
*G06F 12/1027* (2016.01)
*G06F 12/02* (2006.01)
*G06F 12/1009* (2016.01)

(52) U.S. Cl.
CPC ...... *G06F 12/1027* (2013.01); *G06F 12/0215* (2013.01); *G06F 12/1009* (2013.01); *G06F 2212/65* (2013.01); *G06F 2212/654* (2013.01); *G06F 2212/68* (2013.01)

(58) Field of Classification Search
CPC ............. G06F 12/1027; G06F 12/0215; G06F 12/1009; G06F 2212/654; G06F 2212/68
See application file for complete search history.

(56) References Cited

U.S. PATENT DOCUMENTS

| 7,334,108 | B1 | 2/2008 | Case et al. | |
|---|---|---|---|---|
| 7,506,106 | B2* | 3/2009 | Diefendorff | G06F 12/0862 711/137 |
| 2007/0101104 | A1* | 5/2007 | Diefendorff | G06F 12/0862 712/225 |
| 2009/0154254 | A1 | 6/2009 | Wong et al. | |
| 2011/0010521 | A1* | 1/2011 | Wang | G06F 12/1027 711/207 |

OTHER PUBLICATIONS

Combined Search and Examination Report for GB1611291.4 dated Dec. 22, 2016, 8 pages.

* cited by examiner

*Primary Examiner* — Than Nguyen
(74) *Attorney, Agent, or Firm* — Nixon & Vanderhye, P.C.

(57) ABSTRACT

An apparatus, system, and method for address translation are provided. Physical address information corresponding to virtual addresses is prefetched and stored, where at least some sequences of the virtual addresses are in a predefined order. The physical address information is prefetched based on identification information provided by a data processing activity, comprising at least a segment identifier and a portion of a virtual address to be translated. The storage has segments of entries, wherein each segment stores physical address information which corresponds to virtual addresses in a predefined order. This predefined order means that it is not necessary to store virtual addresses in the storage. Storage capacity and response speed are therefore gained.

19 Claims, 10 Drawing Sheets

APPARATUS AND METHOD FOR PERFORMING ADDRESS TRANSLATION

This application claims priority to GB Patent Application No. 1611291.4 filed Jun. 29, 2016, the entire contents of which are hereby incorporated by reference.

The present techniques relate to the field of data processing. More particularly, they relate to the performance of address translation.

An apparatus which performs address translation, such as a translation lookaside buffer (TLB), may be used in the performance of a translation of a virtual address (VA), for example as used by a CPU, into a physical address (PA), for example as used by a memory. The TLB stores copies of virtual (input) address/physical address pairs taken from a page table (memory page) in memory, which defines the translations, thereby allowing a memory management unit of which the TLB forms part to translate an input virtual address (received from a master) into a physical address (to be provided to a slave). If the required translation is not present in the TLB, a page table walk (PTW) is performed to retrieve the required translation from a page table in memory.

At least one example described herein provides an apparatus comprising: address translation storage to store physical address information in a plurality of entries, each entry being contained within a segment of entries, and each segment containing entries which correspond to virtual addresses in a predefined order; address translation circuitry responsive to identification information specified by a data processing activity to generate a corresponding physical address from the stored physical address information, wherein the identification information comprises a segment identifier and a portion of a virtual address, wherein the portion of the virtual address specifies a selected entry within the segment of entries specified by the segment identifier, wherein the address translation storage is capable of storing a number of segments which is at least equal to an expected number of segments which the data processing activity will require within a time period given by an expected latency for the retrieval of a unit of physical address information from a memory; and address translation prefetch circuitry responsive to the segment identifier specified by the data processing activity to initiate retrieval of physical address information corresponding to a predicted segment identifier which is the expected number of segments after the segment identifier.

At least one example described herein provides a method of address translation comprising the steps of: storing physical address information in a plurality of entries, each entry being contained within a segment of entries, and each segment containing entries which correspond to virtual addresses in a predefined order; generating a corresponding physical address from the stored physical address information in response to identification information specified by a data processing activity, wherein the identification information comprises a segment identifier and a portion of a virtual address, wherein the portion of the virtual address specifies a selected entry within the segment of entries specified by the segment identifier, wherein a number of segments are capable of being stored which is at least equal to an expected number of segments which the data processing activity will require within a time period given by an expected latency for the retrieval of a unit of physical address information from a memory; and initiating retrieval of physical address information corresponding to a predicted segment identifier which is the expected number of segments after the segment identifier in response to the segment identifier specified by the data processing activity.

At least one example described herein provides an apparatus comprising: means for storing physical address information in a plurality of entries, each entry being contained within a segment of entries, and each segment containing entries which correspond to virtual addresses in a predefined order; means for generating a corresponding physical address from the stored physical address information in response to identification information specified by a data processing activity, wherein the identification information comprises a segment identifier and a portion of a virtual address, wherein the portion of the virtual address specifies a selected entry within the segment of entries specified by the segment identifier, wherein a number of segments are capable of being stored which is at least equal to an expected number of segments which the data processing activity will require within a time period given by an expected latency for the retrieval of a unit of physical address information from a memory; and means for initiating retrieval of physical address information corresponding to a predicted segment identifier which is the expected number of segments after the segment identifier in response to the segment identifier specified by the data processing activity.

At least one example described herein provides a data processing system comprising: an apparatus according to the above example; data processing circuitry to perform the data processing activity; and the memory.

The present techniques will be described further, by way of example only, with reference to embodiments thereof as illustrated in the accompanying drawings, in which.

At least one example described herein provides an apparatus comprising: address translation storage to store physical address information in a plurality of entries, each entry being contained within a segment of entries, and each segment containing entries which correspond to virtual addresses in a predefined order; address translation circuitry responsive to identification information specified by a data processing activity to generate a corresponding physical address from the stored physical address information, wherein the identification information comprises a segment identifier and a portion of a virtual address, wherein the portion of the virtual address specifies a selected entry within the segment of entries specified by the segment identifier, wherein the address translation storage is capable of storing a number of segments which is at least equal to an expected number of segments which the data processing activity will require within a time period given by an expected latency for the retrieval of a unit of physical address information from a memory; and address translation prefetch circuitry responsive to the segment identifier specified by the data processing activity to initiate retrieval of physical address information corresponding to a predicted segment identifier which is the expected number of segments after the segment identifier.

The inventors of the present techniques have realised that an approach to address translation can be provided according to which physical addresses can be generated based on the entries of an address translation storage (which may for example be a translation lookaside buffer (TLB)), without the need for the corresponding virtual addresses to be stored. These techniques are enabled by making use of certain identifiers available to a master (or a data processing activity executed by a master) related to each transaction which requires an address translation, and the recognition that some data processing activities process data in a predefined order. Accordingly in such circumstances there are at least blocks of data which are written to and read from memory in a specific order (such as a sequential order). For example, the data processing activity may be the processing of display data, wherein the display data is for example read on a line-by-line or a tile-by-tile basis. In this situation the individual lines or tiles then represent regions of a display frame for which the component data are processed in a specific well-defined order. In particular the virtual addresses related to the data in that region are correspondingly then accessed in a predefined order. The present techniques recognise that in this situation the data processing activity can provide the address translation storage/circuitry with an indication of the region (of virtual addresses in a predefined order) which it is currently processing and physical address translations can then be provided from the address translation storage from a part (referred to herein as a segment) thereof identified by that indication and in which the physical address translations have previously been stored in the corresponding predefined order. When the data processing activity provides the identification information it is used to select a given entry in the address translation storage in order to identify the physical address information required to generate the corresponding physical address(es). Physical address information stored in each entry within a single segment corresponds to virtual addresses in a specific order, and hence can be read from the storage sequentially without reference to each virtual address individually. Further it should be noted that the "portion" of a virtual address referred to here is intended in the sense of a strict subset, i.e. less than all of the virtual address, given that the function served by this portion is the identification of an entry within a segment, and therefore only a limited number of bits is expected to be required.

This means that virtual addresses do not themselves need to be stored in the address translation storage, but rather only the physical address information (which could in fact be a set of physical addresses, or otherwise sufficient information to allow a set of physical addresses to be constructed). Not only does this mean that storage space of the address translation storage is saved, but further that address translation circuitry associated therewith is also simplified, since a complex "look-up" functionality does not need to be provided according to which a received virtual address must be compared against many stored virtual addresses to determine if the required translation is currently stored. As such, the control circuitry (logic) is simple and the address translation provided can operate fast, even when the address translation storage is large. Moreover, the power consumption of such a device is also small, since only one entry in the storage needs to be accessed for each translation required. Indeed the fact that only one entry in the storage needs to be accessed for each translation required further means that the "look-up" time for the apparatus of the present techniques is to a large degree independent of the number of entries it holds.

The segment identifier comprised within the identification information provided by the data processing activity may take a variety of forms, in particular, may directly correspond to the enumeration of the segments in the address translation storage. Alternatively there may be a mapping between the segment identifier provided and the addressing for the segments, for example where a larger set of segment identifiers is used by the data processing activity than the number of segments in the address translation storage, in which case the segment identifier may for example be mapped modulo the number of segments, as a hash function, etc., in order to address a selected segment.

The physical address information which corresponds to a virtual address is retrieved from a memory (for example from a page table stored therein) and then stored in the address translation storage. In order to pre-populate entries (and avoid explicitly incurring the latency of this memory access), the present techniques propose to prefetch the physical address information prior to it being required by the data processing activity. The present techniques make further use of the segments in this regard, and address translation storage is provided which can store content for a number of segments that is at least equal to the number required to store the physical address information which is prefetched from memory, prior to being required by the data processing activity. That is, it must be capable of storing at least as many segments as will be required by the data processing activity during a time period which is given by the duration of the retrieval of a unit of physical address information from memory (for example the latency of a page table walk on a TLB miss). To support this the address translation prefetch circuitry is has a configuration to prefetch the physical address information expected to be required at a point in the near future, based on the segment identifier comprised within the identification information currently being provided by the data processing activity. Where there is a mapping between the segment identifier and the addressing of the segments as mentioned above this same mapping will clearly also be used by the address translation prefetch circuitry to store prefetched physical address information in the address translation storage.

In some embodiments, the segment identifiers specified by the data processing activity are specified in a predefined sequence. When the data processing activity is processing data in a particular manner, such as is the case in the above-mentioned example of line-by-line (or tile-by-tile) display data processing, it can generally be expected that segment identifiers will be specified in a predefined sequence. This order corresponds to the order in which the data processing activity requires data corresponding to the segments and enables the prefetch circuitry to predict the predicted segment identifier based on the predefined sequence of the segment identifiers. Accordingly, the address translation prefetch circuitry can then retrieve the physical address information for each entry of a particular segment in advance of it being required, by predicting that the physical address information for that segment will be requested by the data processing activity according to the predefined sequence.

In some embodiments, the predefined sequence is sequential segment identifiers. While the predefined sequence of segment identifiers is not limited to being sequential identifiers, it may be sequential in that the identifiers are requested in a consecutive order by the data processing activity. Alternatively, the predefined sequence may be any other sequence which is predefined and allows prediction of the segments which will be subsequently required.

The data processing activity may take a variety of forms, but may for example be one of several distinct data processing activities which are taking place. These distinct data processing activities may be independent of one another, or some of them may be related to one another. As such, they may require access to independent or related data sets. In this context the present techniques can provide that the address translation storage is subdivided into a plurality of sectors, these sectors being used independently of one another and therefore capable of supporting independent data processing activities. An identifier associated with each data processing activity can then be used to identify the sector to be used. Accordingly, in some embodiments, the identification information specified by the data processing activity further comprises a sector identifier, and the address translation storage comprises a plurality of sectors, wherein each sector comprises a plurality of segments, and the address translation storage is responsive to the sector identifier to select the selected entry within a sector specified by the sector identifier. For example in the context of the display processing each data processing activity may be the data processing for one layer of multiple display layers. The sector identifier may then for example be provided in the form of an identifier for a given layer or an identifier for the component performing the processing for that layer. The division of the address translation storage into sectors enables each sector independently to store physical address information according to the particular data requirements of the data processing.

In some embodiments, the data processing activity is one of multiple data processing activities, and each data processing activity has a unique sector identifier corresponding to a unique sector of the plurality of sectors. Accordingly, each data processing activity can be treated as entirely independent of the other data processing activities and is allocated its own separate sector on the basis of a unique sector identifier. For example there may be a one-to-one correspondence between master IDs of the masters performing the data processing activities and the sector identifiers.

In some embodiments, the multiple data processing activities are display data processing activities for generating a frame of display data, and each display data processing activity is for processing a display layer from among multiple display layers for the frame of display data. The sequential manner in which sections of display data are typically accessed not only makes the present techniques applicable to this data processing context, but the independent manner in which multiple display layers are typically processed (before being composited together into a final composited layer to be displayed) gives further applicability to such embodiments of the present techniques.

In some embodiments, the identification information specified by the data processing activity further comprises a subsector identifier, and the address translation storage further comprises a plurality of subsectors, wherein each sector comprises a plurality of subsectors, each subsector comprises a plurality of segments, and the address translation storage is responsive to the subsector identifier to select the selected entry within a subsector specified by the subsector identifier. This enables separate sectors to be further subdivided, which can support the data processing of partially related data sets. For example, where a given master performing a data processing activity is allocated a given sector of the address translation storage, further subdivision of that sector may be effected to provide the master with address translation storage for two or more data sets. In the context of display data processing, and a given display layer being processed by a given master, this technique can for example be used to allow each subsector to represent a plane within a layer, such as may represent chrominance and luminance for YUV encoded display data.

In some embodiments, the physical address information stored in an entry corresponds to a plurality of physical addresses. This enables an entry to be reused for acquiring each of the plurality of physical addresses and therefore supports more efficient use of the address translation storage and moreover of the memory system of which it can form part, since groups of physical addresses can be retrieved in a single memory transaction for storage.

For example in some embodiments an entry contains the physical address information given in a memory page. This facilitates the operation of the address translation prefetch circuitry, which can then retrieve the physical address information of a single memory page (page table) from memory containing all the information required by the address translation circuitry to generate the physical addresses.

The segments of the address translation storage contain entries which correspond to virtual addresses in a predefined order. The data processing activity may therefore provide the segment identifier in a variety of contexts, as long as the virtual addresses adhere to that predefined order for a given segment identifier. Hence in some embodiments the segment identifier is a region identifier, which identifies a region of a display frame currently being processed by the data processing activity. The present techniques recognise that regions of a display frame may be defined which indeed comprise data for which the virtual addresses are in a predefined order. This in particular means that only the segment (region) identifier is required to identify this sequence of virtual addresses and that no explicit storage of those virtual addresses themselves is necessary. The storage of address translations (i.e. in fact just the storage of the physical address information) according to the present techniques is therefore well suited to the display data processing context. More efficient address translation and the ability to store more address translations is therefore supported.

A segment therefore may be used to store the physical address information for a region of a display frame. In support of this, in some embodiments, a number of entries in each segment is at least equal to a maximum number of units of physical address information for a single region of the display frame, wherein the unit of physical address information is the physical address information given in a memory page. Accordingly, the segments may be defined to be able to accommodate sufficient physical address information in units of memory pages, facilitating the retrieval of that physical address information by the prefetching mechanism.

Further, in order to simplify the addressing scheme, in some embodiments the number of entries in each segment is the maximum number rounded up to a next power of two. The present techniques recognise that there is a trade-off to be made between the easier addressing scheme which this then provides on a segment-by-segment basis and the number of unused entries which then results (given by the round up). In particular where the number of unused entries is only a relatively small proportion of the total number of entries in a segment, the resulting simplified addressing may be determined to be worthwhile.

In some embodiments, the region identifier is a line identifier which identifies a display line of the display frame currently being processed. This may be the case, for example, where the data processing activity is processing display data in a raster scan data processing order. In some embodiments, the region identifier is a tile identifier which identifies a display tile of the display frame currently being processed. This may be the case, for example, where the data processing activity is processing display data in a tile based processing order. Such examples, of line or tile identifiers, may present examples where a mapping between the line or tile identifier ("segment identifier") and the addressing of the segments is required, if there are more lines or tiles which can be enumerated than segments.

Other region definitions are also contemplated, as long as the region comprises data for which the corresponding virtual addresses are in a predefined order.

In some embodiments, the portion of the virtual address which specifies the selected entry within the segment is a higher order set of bits than a lower order set of bits which is used to specify a physical address within the entry. As mentioned above, the portion of the virtual address is intended to be a portion which is less than the whole of the virtual address, and where physical address information corresponding to multiple physical addresses is stored in an entry, a further portion of the virtual address can thus be used to identify a particular physical address.

In some embodiments each entry comprises a validity bit for identifying whether the entry is valid. This provides a mechanism in particular for asserting the invalidity of a given entry, so that the entry can be overwritten with new content.

Some particular embodiments will now be described with reference to the figures.

Figure 1:
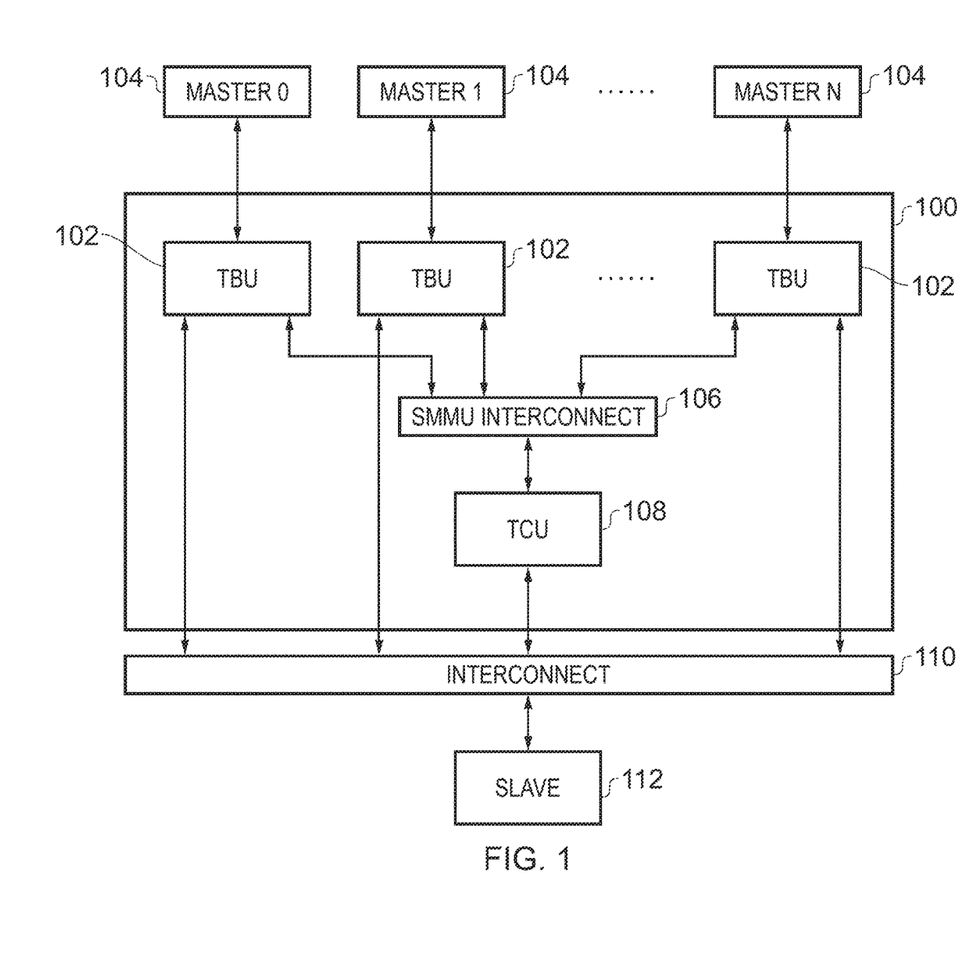
FIG. 1 schematically illustrates a data processing system comprising a memory management unit comprising the apparatus of one embodiment.

FIG. 1 schematically illustrates an example of a data processing apparatus 100 arranged to communicate with a plurality of masters 104 and with a slave 112, whereby communication with the slave is carried out via an interconnect 110. The data processing apparatus 100 in this example is a system memory management unit (SMMU) and is shown to comprise a plurality of translation buffer units TBUs 102 (translation lookaside buffers), a System Memory Management Unit (SMMU) interconnect 106, and a translation control unit TCU 108. In a manner with which one of ordinary skill in the art will be familiar, the TBU 102 for each master device 104 is provided to modify incoming transactions by replacing the virtual address information they contain with corresponding physical addresses. The phrase "virtual address information" is intentionally used here, since according to the present techniques a full virtual address does not need to be provided by one of the masters 104 to its TBU 102, as mentioned above by virtue of the reference to a virtual address "portion" and will become more clear from the following description. The modified transactions, with their virtual address information translated into physical addresses, are then passed to the slave 112 via the interconnect 110. The TBUs 102 request translations from the TCU 108, and in the event that a translation is not stored in the TCU 108 the physical addresses must be retrieved from memory. The whole process of requesting a translation and returning the translation to the TBU 102 is a page table walk (PTW), which in standard systems can take many cycles (up to several hundred cycles) to be performed.

Figure 2:
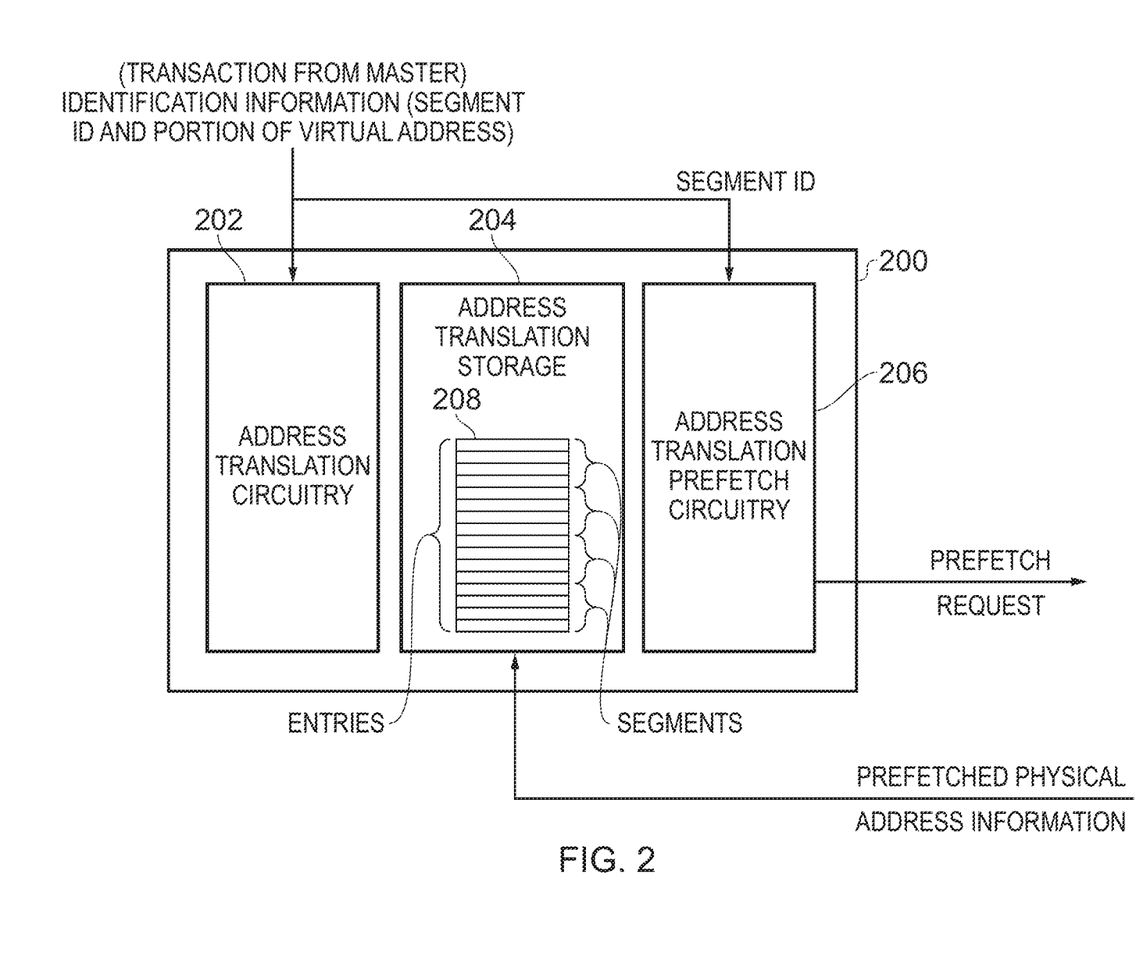
FIG. 2 schematically illustrates an apparatus according to one embodiment.

FIG. 2 schematically illustrates an example of an apparatus 200 according to the present techniques, comprising address translation circuitry 202, address translation storage 204, and address translation prefetch circuitry 206. FIG. 2 further illustrates a plurality of entries 208 divided into segments within the address translation storage 204. The apparatus schematically illustrated can act as a translation lookaside buffer such as is contained within a TBU 102 of FIG. 1. As shown in the figure, the apparatus receives a transaction from a data processing activity being executed (e.g. by one of the masters 104), wherein the transaction includes identification information comprising at least a segment identifier and a portion of a virtual address. The address translation prefetch circuitry 206 receives the segment identifier from the identification information of the translation request and performs a prefetch operation to prefetch from memory the physical address information of a predicted segment that is predicted to be required by the data processing activity after an expected latency of the PTW for the predicted segment.

The prefetched physical address information is accordingly returned to the apparatus 200 and stored in the address translation storage 204. The physical address information is retrieved on a memory page basis from memory. In other words, the labelled "prefetch request" is a request for the physical address information of a whole memory page (page table), and not just a single physical address. Once the physical address information of a memory page is retrieved from memory as a result of the prefetch request, the physical address information of the memory page is stored. According to the present techniques there is no requirement for a whole memory page (i.e. including the virtual addresses) to be retrieved from memory, since the virtual addresses will not be stored. Hence, the whole memory page (including virtual addresses) may in fact be retrieved from memory, but only the physical address information of that memory page will then be stored. Alternatively in a variant, only the physical address information of the memory page is retrieved from memory and subsequently stored. This reduces the size of data which must be carried by the interconnect.

The identification information received is also used by the address translation circuitry 202 in order to identify the segment of entries currently required to be accessed to perform the address translations needed to support the data processing activity. The segment identifier comprised within the identification information is used to identify the segment currently being requested, and a portion of the virtual address comprised within the identification information is used to identify a particular entry within the identified segment. The particular entry thus identified, the physical address information stored therein is used to generate a set of physical addresses. These adhere to a predefined order, which commonly corresponds to sequential virtual addresses. However, if the data processing activity so requires, any other predefined order may also be implemented.

Figure 3:
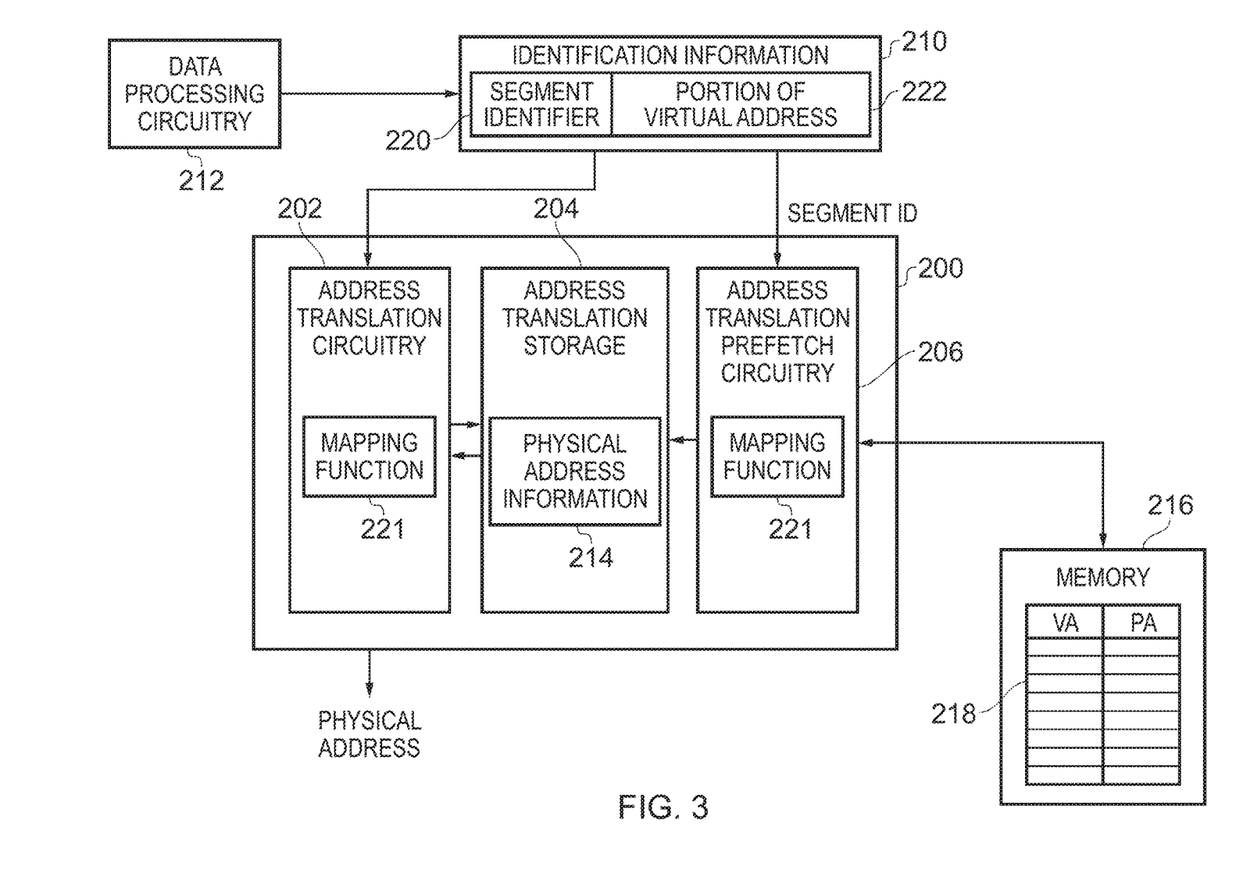
FIG. 3 schematically illustrates an apparatus according to one embodiment.

FIG. 3 schematically illustrates a data processing system in one embodiment. Moreover this figure provides a further schematic illustration of an example context in which apparatus 200 of FIG. 2 may be used. The system shown comprised the data processing circuitry 212 (which may for example be a CPU or GPU), the apparatus 200 (which may for example be provided as part of a SMMU as shown in FIG. 1), and a memory 216. The memory 216 is shown comprising a page table 218, in which the correspondence between a certain set of virtual addresses (VA) and physical addresses (PA) is held. The data processing circuitry 212, when performing a data processing activity, requires access to data stored in memory 216, which it references with virtual addresses. However, when issuing a memory access request the data processing circuitry in fact provides identification information 210 comprising a segment identifier 220 and only a portion of a virtual address 222. The segment identifier is an indication of the particular set of data which is currently being processed (and for which the corresponding virtual addresses adhere to a predefined order). For example, in the context of this example of display data processing, the segment identifier is provided as a line or tile identifier. As such, it will be appreciated that the data processing activity is not required to be configured to issue a segment identifier which matches the segment enumeration of the address translation storage, but rather has merely been arranged to provide a line or tile identifier (or the like) when issuing transactions. When a region ID (e.g. line or tile identifier) is provided as the segment identifier 220 of the identification information 210 it is used by the address translation apparatus 200 to generate an addressing for a segment within the address translation storage 204. This is required in the illustrated example where the number of line or tile IDs which can be specified is greater than the number of segments in the address translation storage 204. Hence the address translation circuitry 202 uses a mapping function 221 (in this case a modulo function to fold the larger numerical space of the segment identifier onto the smaller numerical space of the segments, but this could also be any other such suitable function such as a hash function). Physical address information 214 is stored in the entries of the address translation storage 204. As noted above, this may in fact be the verbatim physical addresses, or may for example omit some lowest order bits if, say, the sequential nature of these addresses allows these lowest order bits easily to be reconstructed. As shown in this example, the identification information 210 is supplied by the data processing activity of the data processing circuitry 212 and this provides the address translation prefetch circuitry 206 with the segment ID 220 (such as a line ID or a tile ID) to enable a predicted segment to be identified and prefetched from a page table 218 within a memory 216. The address translation prefetch circuitry 206 determines the predicted segment on the basis of the current segment identifier, using the expected order in which the segment identifiers appear and allowing for the latency of the required prefetch/page table walk process. The prefetched segment content is then stored in the address translation storage 204 in the segment identified (again if necessary by the use of the same mapping function 221).

The identification information 210 is received by the address translation circuitry (comprising segment identifier 220 and the virtual address portion 222) as described above with regard to FIG. 2. Note that the identification information may comprise further information, in particular where the data processing activity is one of several independent data processing activities. In this situation the entries of the address translation storage 204 may be divided into sectors, with use of a sector allocated to a data processing activity. Each data processing activity can then provide an additional identifier to allow a sector to be selected. Further detail of this is described later. FIG. 3 also shows the physical address, having been generated by the address translation circuitry 202 using the stored physical address information 214, being output. In this example the physical address information 214 stored comprises an upper portion of the set of physical addresses, with the lowest 12 bits (corresponding to 4 kB memory pages) not stored, but reconstructed when the physical addresses are to be output.

This physical address may then for example be forwarded to a slave device in order to retrieve the data at that particular physical address for a master device.

Figure 4:
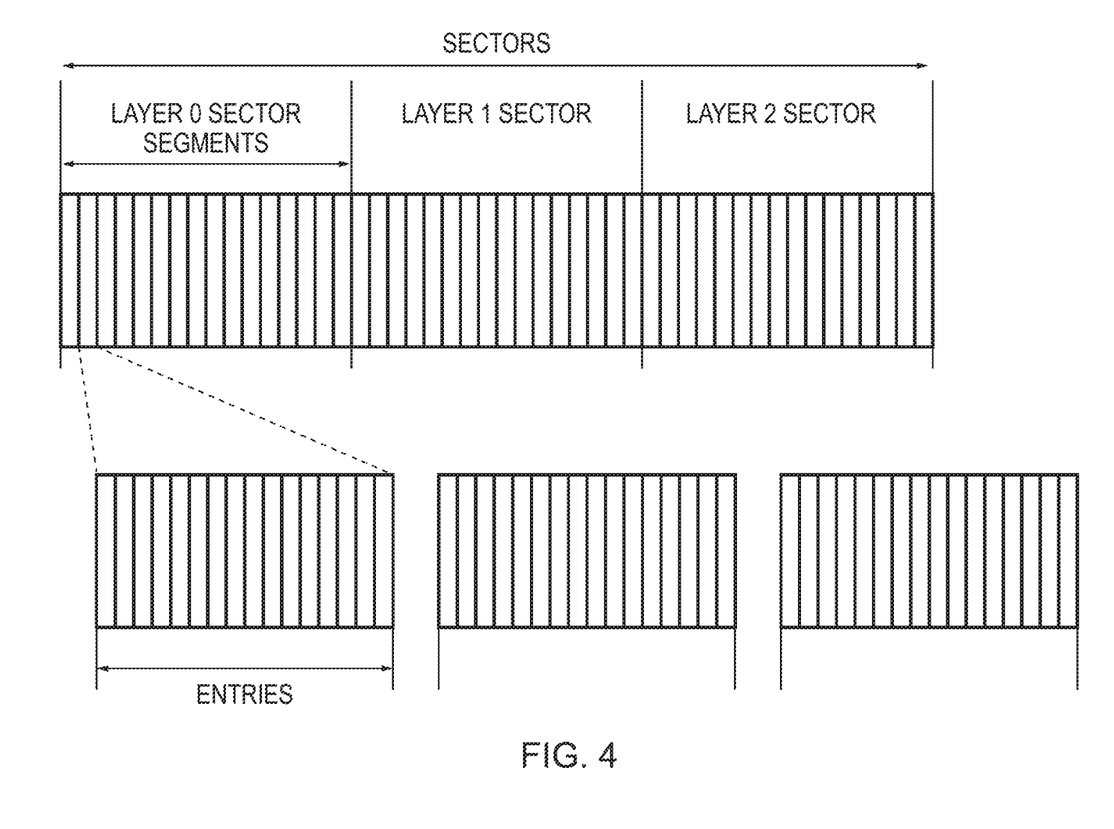
FIG. 4 schematically illustrates the sectors, segments and entries of an address translation storage according to one embodiment.

FIG. 4 illustrates the division of the entries in the address translation storage 204. A plurality of sectors are shown which each comprise a plurality of segments, wherein a segment is illustrated to comprise a plurality of entries. Each sector of the address translation storage 204 may be associated with a distinct data processing activity, for example, a sector may correspond to the processing of a given layer of a display frame as the labels in FIG. 4 show. The division of the address translation storage 204 can vary depending on the data processing activity (or activities) being performed by the master. In contexts in which the address translation storage is provided to support display data processing activities, the number of sectors of the address translation storage 204 can be made at least equal to the number of layers which are supported by the format of the display data being processed by the data processing activity. To take just one simple example, in a case where a display data format allows for 4 read layers and a single write-back layer, a total of 5 sectors are required. The number of segments within each sector corresponds to the number of display regions (lines or tiles, for example) which are expected to be processed during the latency of page table walk, i.e. the time period for the required physical address information to be retrieved from memory. Further, the number of entries in each segment should be at least as many entries as are required to store the physical address information from the memory pages which are required to translate the virtual addresses which correspond to the physical addresses of the data in a single display region (e.g. line or tile). Additionally, this number of entries able to be stored in each segment is a minimum, and may be rounded up to the nearest power of two in order to simplify addressing by providing an integer number of bits to index an entry. This can result in a small proportion of each segment in fact then not being used, but the benefit of a simplified addressing scheme can outweigh this and indeed the avoidance of the need to store any virtual addresses in any case easily provides a far greater space saving.

Figure 5:
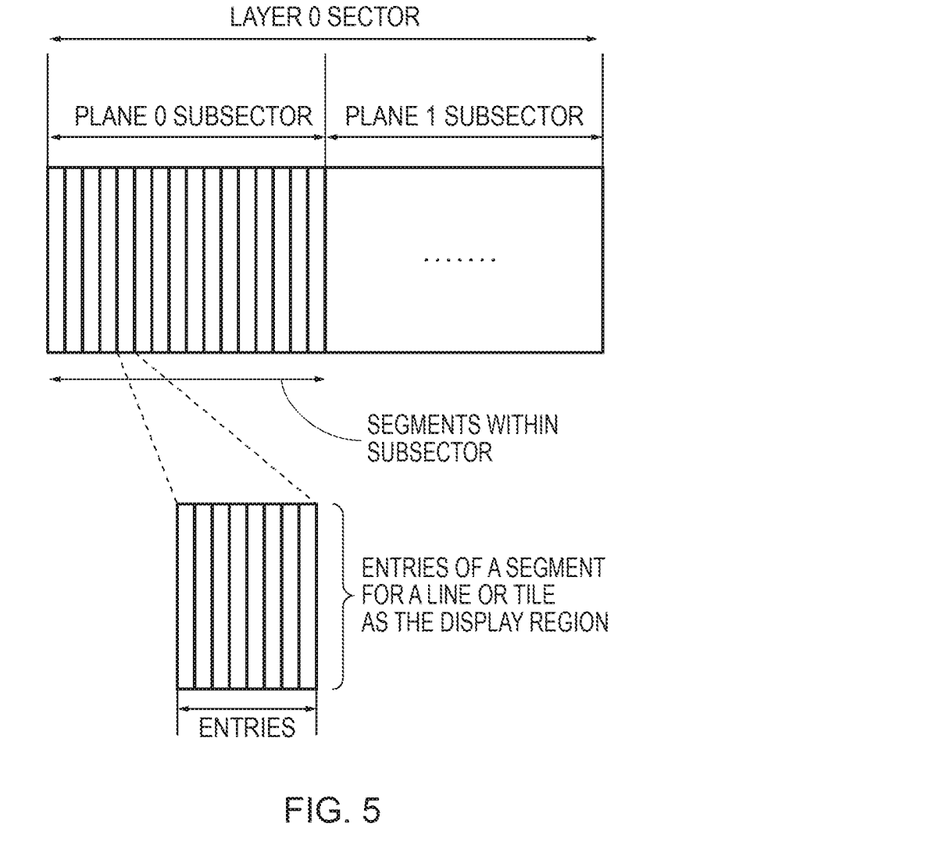
FIG. 5 schematically illustrates a sector, subsectors, segments, and entries of an address translation storage according to one embodiment.

FIG. 5 illustrates the subdivision of a single sector into a plurality of subsectors according to some embodiments of the present techniques. In this example the sector is split into two subsectors. This allows the sector, which has been allocated to a particular data processing activity (for example the processing of a selected display layer), to be used in two independent parts (where here each subsector corresponds to a particular plane of a display layer). For example in the case of an uncompressed 8-bit YUV 2-plane format, each of the read layers is divided into two subsectors, each corresponding to one of two planes: one plane for chrominance and another for luminance.

Figure 6:
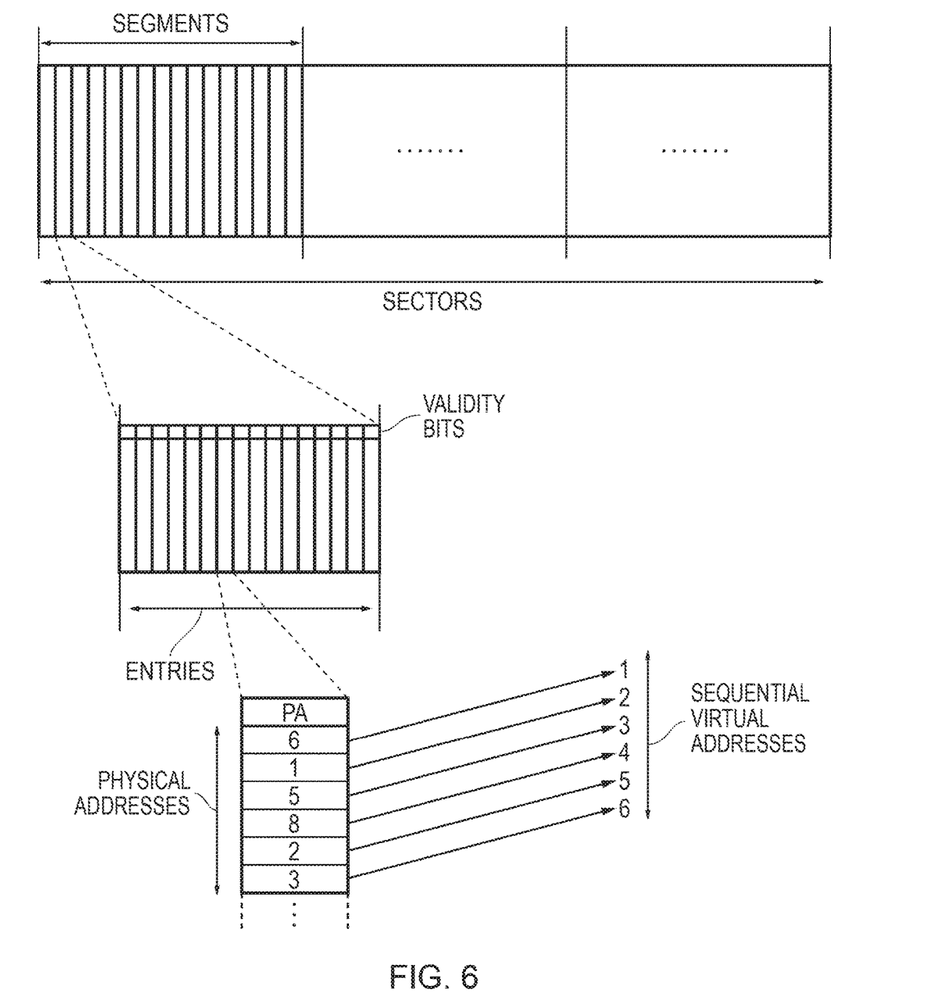
FIG. 6 schematically illustrates the physical addresses in an entry corresponding to sequential virtual addresses.

FIG. 6 illustrates the contents of an entry according to one embodiment of the present techniques. A plurality of physical addresses are illustrated as being held within an entry.

The physical addresses stored within an entry are the translations of virtual addresses in a predefined order, which may be a sequential order of consecutive virtual addresses. Note that the physical addresses themselves (in this example) do not adhere to a sequential pattern. Accordingly, a lookup process may take place to translate virtual addresses without requiring usage of every virtual address (input address), since the physical address translations which correspond to each virtual address appears sequentially within the entry and correspond to sequential virtual addresses. FIG. 6 further illustrates that each entry contains a validity bit which denotes the validity state of the physical address information currently stored therein.

Figure 7A:
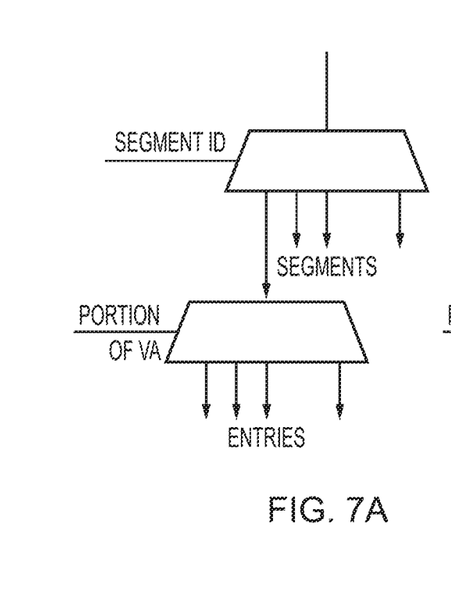
FIG. 7A schematically illustrates the addressing of segments and entries according to one embodiment.
Figure 7B:
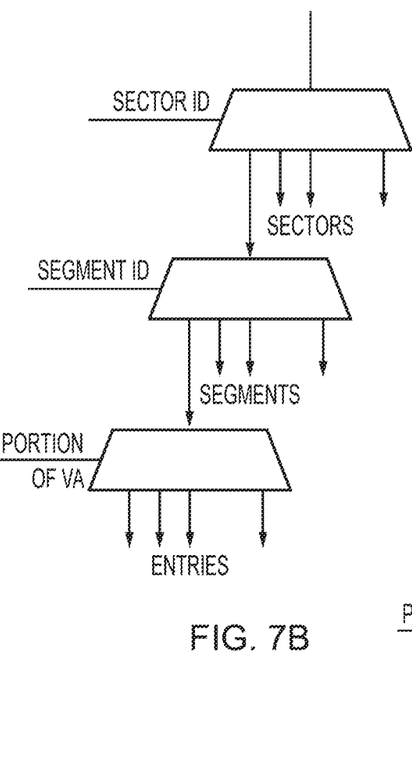
FIG. 7B schematically illustrates the addressing of sectors, segments and entries according to one embodiment.
Figure 7C:
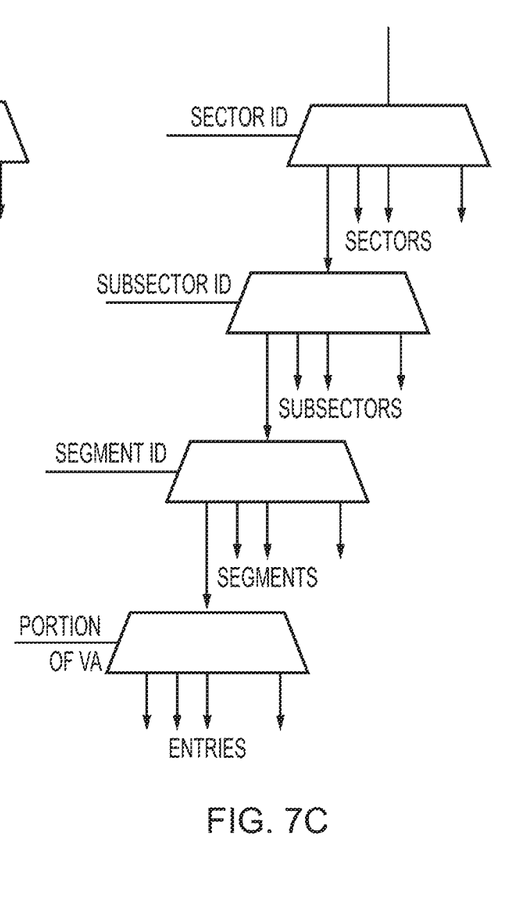
FIG. 7C schematically illustrates the addressing of sectors, subsectors, segments and entries according to one embodiment.

FIGS. 7A, 7B and 7C illustrate examples of the addressing of entries in the form of the corresponding circuitry which is provided in the address translation circuitry (for example circuitry 202 in the embodiment of FIG. 2). An entry of the address translation storage is addressed (identified) by the address translation circuitry and this addressing takes place using the identification information supplied by the data processing activity. The content of the addressed entry of the address translation storage is then used for generating the required physical addresses. Due to this direct addressing scheme a TLB lookup can be performed without the necessity of the comparison of an input virtual address and stored virtual addresses (in the manner of a traditional TLB), and the access to the address translation storage is correspondingly fast. There is additionally no need to store any virtual addresses, saving storage space.

FIG. 7A illustrates an example of the addressing of segments and entries. A segment identifier (segment ID) (possibly mapped onto the particular segment enumeration required as described above by the use of a mapping function such as 221 in FIG. 3) is shown to be supplied to a first selector (multiplexer), which selects a segment to be addressed on the basis of the segment identifier. As described above, this segment identifier may for example be generated on the basis of a region identifier (line or tile) provided by a master performing display data processing activity. Further, a portion of a virtual address (described later with regard to FIG. 9), is shown being supplied to a second selector (multiplexer). The portion of the virtual address is used to identify an entry within the selected segment.

FIG. 7B illustrates an example of the addressing of sectors, segments and entries, i.e. extending the example of FIG. 7A to include sectors. A sector identifier (for example as discussed above in the form of a master or layer identifier) is supplied to a further selector (multiplexer), which selects a sector to be addressed which is identified by the sector identifier. Further, a segment identifier identifies a segment and a portion of a virtual address identifies an entry to be selected in accordance with the above discussion of the example illustrated in FIG. 7A.

FIG. 7C illustrates an example of the addressing of sectors, subsectors, segments and entries, i.e. extending the example of FIG. 7B to include subsectors. A sector identifier, segment identifier, and a portion of a virtual address are illustrated to be supplied to respective selectors (multiplexers) to identify (select) a sector, segment, and entry respectively in accordance with the examples described above and illustrated in FIGS. 7A and 7B. Further, the sector identified by the sector identifier is also divided into subsectors, one of which is identified by a subsector identifier. In this example, it is from the selected subsector that a segment is selected using the segment identifier.

Figure 8A:
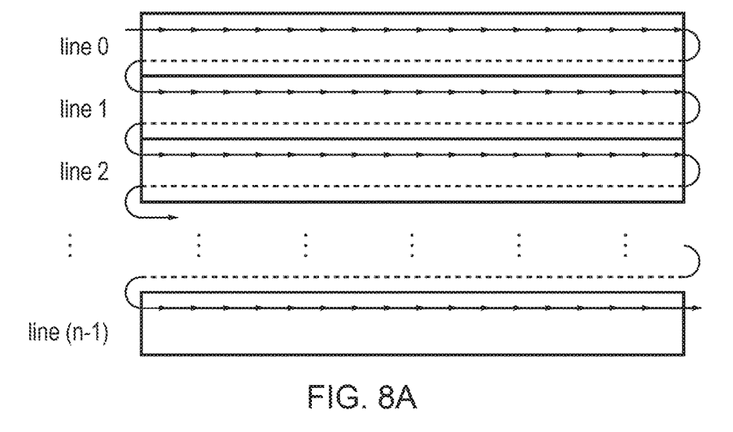
FIG. 8A illustrates a line by line raster scan data processing order in a frame of display data.

FIG. 8A illustrates an example of a frame of display data being processed in raster scan data processing order. Such a processing order processes the display frame on a line by line basis and sequentially within a line. Hence for data processing activities which use a raster scan data processing order, the present techniques treat a region of a display frame currently being processed as a line of the display frame, and the physical address information for that line will be stored in a corresponding segment of the address translation storage 204. Groupings of lines (e.g. pairs, sets of four, and so on) could also be treated as "a region" depending on the particular correspondence of the size of a region (i.e. for storage in a segment) that may then usefully result.

Figure 8B:
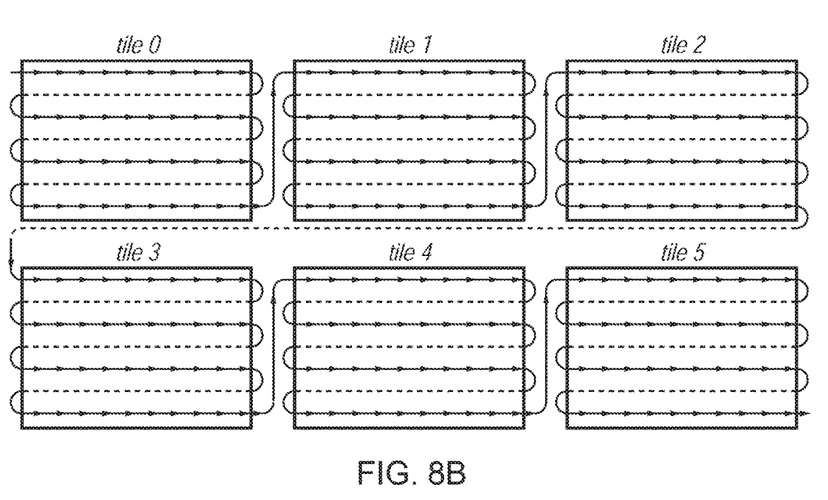
FIG. 8B illustrates a tile based data processing order in a frame of display data.

FIG. 8B illustrates an example of a frame of display data being processed in a tile based data processing order. Such a processing order processes the display frame on a tile by tile basis and in a raster scan order within each tile as shown. Hence for data processing activities which use a tile based data processing order, the present techniques can treat a region of a display frame currently being processed as a tile of the display frame, and the physical address information for that tile will be stored in a corresponding segment of the address translation storage 204. Groupings of tiles (e.g. pairs, sets of four, and so on) could also be treated as "a region" depending on the particular correspondence of the size of a region (i.e. for storage in a segment) that may then usefully result.

Figure 9:
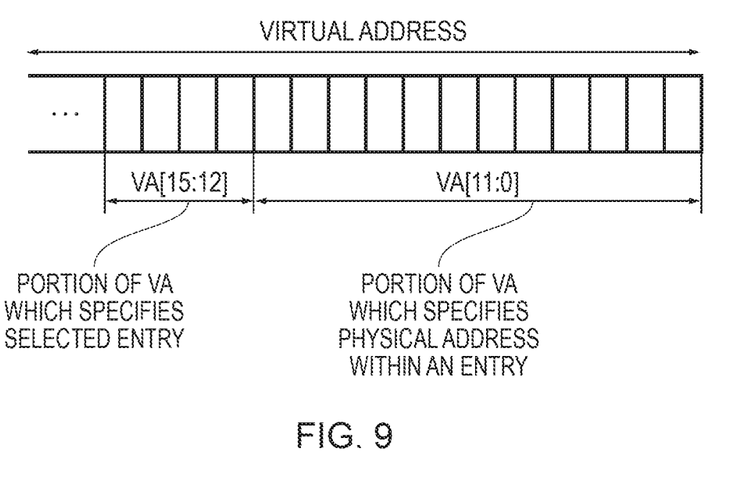
FIG. 9 illustrates the use of some parts of a virtual address according to one embodiment.

FIG. 9 illustrates the use of some parts of a virtual address according to one embodiment of the present techniques. Shown are two portions of the virtual address. First, a higher order bit portion of a virtual address is shown (bits [15:12]) which specifies the selected entry. Secondly, a lower order portion of the virtual address is shown which specifies the physical address within an entry (bits [11:0]), this corresponding to an example in which 4 kB memory pages are used. It will be appreciated that although in this case the bits which correspond to these portions are VA[15:12] and VA[11:0] respectively, other respective portions of a virtual address can be used for these two purposes depending on the number of entries in a segment and the number of physical addresses in an entry.

Figure 10:
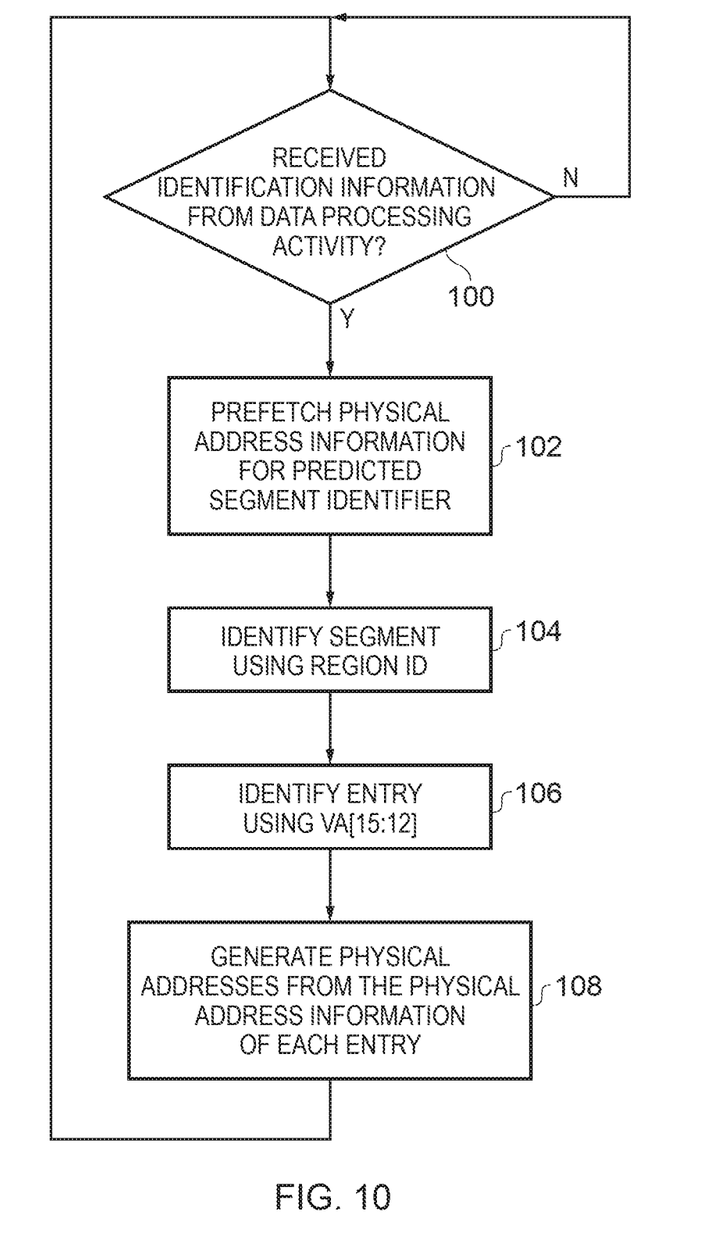
FIG. 10 shows a sequence of steps which are taken according to the method of one embodiment.

FIG. 10 is a flow diagram which illustrates the steps taken according to the method of one embodiment of the present techniques. As illustrated, in step 100 the identification information (210 in the example of FIG. 3) is received from the data processing activity. This identification information comprises an indication of the region currently being processed (which is interpreted as a segment identifier, possibly additionally with the use of a mapping function such as 221 in FIG. 3) and a portion of a virtual address. In some embodiments, the identification information may further comprise a sector identifier (and possibly further a subsector identifier) in addition to this. In step 102, the segment identifier is used to predict the physical address information that is required to be prefetched from memory prior to being requested by the data processing activity. This prediction is based on the order in which the segment identifiers (e.g. line or tile identifiers) are received from the data processing activity. In step 104, a segment to access is identified using the region identifier (segment identifier) from the identification information and in step 106 an entry within that segment is identified using a portion of a virtual address. This portion is illustrated as being, for example, bits VA[15:12]. In step 108, the physical addresses which correspond to the virtual addresses used by the data processing activity are generated from the physical address information stored in the identified entry of the identified segment. It should be appreciated that although for clarity of discussion steps 102 and step 104-8 are shown as sequential steps in FIG. 10, they are not required to be performed in sequence, given that these are separate activities, the first relating to prefetching and the second to accessing the storage. In other words the identification information received from the data processing activity may be used in parallel to initiate the required prefetch of physical address information based on a predicted segment identifier and also to generate the physical addresses based on the received identification information.

In brief overall summary, an apparatus, system, and method for address translation are provided. Physical address information corresponding to virtual addresses is prefetched and stored, where at least some sequences of the virtual addresses are in a predefined order. The physical address information is prefetched based on identification information provided by a data processing activity, comprising at least a segment identifier and a portion of a virtual address to be translated. The storage has segments of entries, wherein each segment stores physical address information which corresponds to virtual addresses in a predefined order. This predefined order means that it is not necessary to store virtual addresses in the TLB. Storage capacity and response speed are therefore gained.

In the present application, the words "configured to . . . " or "arranged to" are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" or "arranged to" does not imply that the apparatus element needs to be changed in any way in order to provide the defined operation.

Although illustrative embodiments have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

The invention claimed is:

1. An apparatus comprising:
   address translation storage to store physical address information in a plurality of entries, each entry being contained within a segment of entries, and each segment containing entries which correspond to virtual addresses in a predefined order;
   address translation circuitry responsive to identification information specified by a data processing activity to generate a corresponding physical address from the stored physical address information,
   wherein the identification information comprises a segment identifier and a portion of a virtual address, wherein the portion of the virtual address specifies a selected entry within the segment of entries specified by the segment identifier,
   wherein the address translation storage is configured to store a number of segments which is at least equal to an expected number of segments which the data processing activity will require within a time period given by an expected latency for the retrieval of a unit of physical address information from a memory; and
   address translation prefetch circuitry responsive to the segment identifier specified by the data processing activity to initiate retrieval of physical address information corresponding to a predicted segment identifier which is the expected number of segments after the segment identifier.

2. The apparatus according to claim 1, wherein the segment identifiers specified by the data processing activity are specified in a predefined sequence.

3. The apparatus according to claim 2, wherein the predefined sequence is sequential segment identifiers.

4. The apparatus according to claim 1, wherein the identification information specified by the data processing activity further comprises a sector identifier, and
   wherein the address translation storage comprises a plurality of sectors, wherein each sector comprises a plurality of segments, and the address translation storage is responsive to the sector identifier to select the selected entry within a sector specified by the sector identifier.

5. The apparatus according to claim 4, wherein the data processing activity is one of multiple data processing activities, and each data processing activity has a unique sector identifier corresponding to a unique sector of the plurality of sectors.

6. The apparatus according to claim 5, wherein the multiple data processing activities are display data processing activities for generating a frame of display data, and each display data processing activity is for processing a display layer of multiple display layers for the frame of display data.

7. The apparatus according to claim 4, wherein the identification information specified by the data processing activity further comprises a subsector identifier, and
   wherein the address translation storage further comprises a plurality of subsectors, wherein each sector comprises a plurality of subsectors, each subsector comprises a plurality of segments, and the address translation storage is responsive to the subsector identifier to select the selected entry within a subsector specified by the subsector identifier.

8. The apparatus according to claim 1, wherein the physical address information stored in an entry corresponds to a plurality of physical addresses.

9. The apparatus according to claim 8, wherein an entry contains the physical address information given in a memory page.

10. The apparatus according to claim 1, wherein the segment identifier is a region identifier, which identifies a region of a display frame currently being processed by the data processing activity.

11. The apparatus according to claim 10, wherein a number of entries in each segment is at least equal to a maximum number of units of physical address information for a single region of the display frame, wherein the unit of physical address information is the physical address information given in a memory page.

12. The apparatus according to claim 11, wherein the number of entries in each segment is the maximum number rounded up to a next power of two.

13. The apparatus according to claim 10, wherein the region identifier is a line identifier which identifies a display line of the display frame currently being processed.

14. The apparatus according to claim 10, wherein the region identifier is a tile identifier which identifies a display tile of the display frame currently being processed.

15. The apparatus according to claim 1, wherein the portion of the virtual address which specifies the selected entry within the segment is a higher order set of bits than a lower order set of bits which is used to specify a physical address within the entry.

16. The apparatus according to claim 1, wherein each entry comprises a validity bit for identifying whether the entry is valid.

17. A method of address translation comprising the steps of:
   Storing, in storage, physical address information in a plurality of entries, each entry being contained within a segment of entries, and each segment containing entries which correspond to virtual addresses in a predefined order;
   generating a corresponding physical address from the stored physical address information in response to identification information specified by a data processing activity,
   wherein the identification information comprises a segment identifier and a portion of a virtual address, wherein the portion of the virtual address specifies a selected entry within the segment of entries specified by the segment identifier,
   wherein the storage is configured to store a number of segments which is at least equal to an expected number of segments which the data processing activity will require within a time period given by an expected latency for the retrieval of a unit of physical address information from a memory; and
   initiating retrieval of physical address information corresponding to a predicted segment identifier which is the expected number of segments after the segment identifier in response to the segment identifier specified by the data processing activity.

18. An apparatus comprising:
   means for storing physical address information in a plurality of entries, each entry being contained within a segment of entries, and each segment containing entries which correspond to virtual addresses in a predefined order;
   means for generating a corresponding physical address from the stored physical address information in response to identification information specified by a data processing activity,
   wherein the identification information comprises a segment identifier and a portion of a virtual address, wherein the portion of the virtual address specifies a selected entry within the segment of entries specified by the segment identifier,
   wherein the means for storing physical address information is configured to store at least a number of segments which is at least equal to an expected number of segments which the data processing activity will require within a time period given by an expected latency for the retrieval of a unit of physical address information from a memory; and
   means for initiating retrieval of physical address information corresponding to a predicted segment identifier which is the expected number of segments after the segment identifier in response to the segment identifier specified by the data processing activity.

19. A data processing system comprising:
an apparatus according to claim 1;
data processing circuitry to perform the data processing activity; and
the memory.

* * * * *